(12) United States Patent
Nguyen (10) Patent No.: US 6,385,238 B1
(45) Date of Patent: May 7, 2002

(54) ADAPTIVE EQUALIZATION AND BASELINE WANDER CORRECTION CIRCUIT

(75) Inventor: Thai M. Nguyen, San Jose, CA (US)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 08/984,455

(22) Filed: Dec. 3, 1997

(51) Int. Cl.[7] .............................................. H03H 7/30
(52) U.S. Cl. ...................... 375/232; 375/219; 375/238; 375/317; 714/815
(58) Field of Search ................................ 375/232, 238, 375/219, 317; 327/307; 714/815

(56) References Cited

U.S. PATENT DOCUMENTS

| | | | | |
|---|---|---|---|---|
| 6,038,266 A | * | 3/2000 | Lee et al. ..................... | 375/317 |
| 6,125,470 A | * | 9/2000 | Hee et al. ..................... | 714/815 |
| 6,211,716 B1 | * | 4/2001 | Nguyen et al. ............. | 327/307 |

OTHER PUBLICATIONS

"Baseline Wander Explained", Todd Vafiades, Communication Systems Design, Sep. 1996, p. 28–34.
"An Adaptive Cable Equalizer for Serial Digital Rates to 400 Mb/s", Alan J. Baker, ISSCC96, p. 174–175.
"Considerations for CMOS PHY Design", Mike Harwood, Analog & Mixed–Signal Applications Conference, Jul. 21–22, 1997.

* cited by examiner

Primary Examiner—Stephen Chin
Assistant Examiner—Shuwang Liu
(74) Attorney, Agent, or Firm—Gray Cary Ware & Freidenrich LLP (57) ABSTRACT

An adaptive equalization and baseline wander correction circuit has an adaptive filter loop and an independent baseline wander correction loop by using dual halfwave rectifiers and peak detectors with capacitors to store the peak DC value of the incoming signal to be shared between the two loops.

11 Claims, 11 Drawing Sheets

FIG. 9 PEAK DETECTOR

ADAPTIVE EQUALIZATION AND BASELINE WANDER CORRECTION CIRCUIT

TECHNICAL FIELD

The present relates to an adaptive equalization and baseline wander correction circuit using halfwave rectifiers and peak detectors with capacitors therein to store DC signals used in the baseline wander correction portion of the circuit and in the adaptive filter portion of the circuit. This sharing of capacitors minimizes the total number of circuit components required.

BACKGROUND OF THE INVENTION

Figure 1:
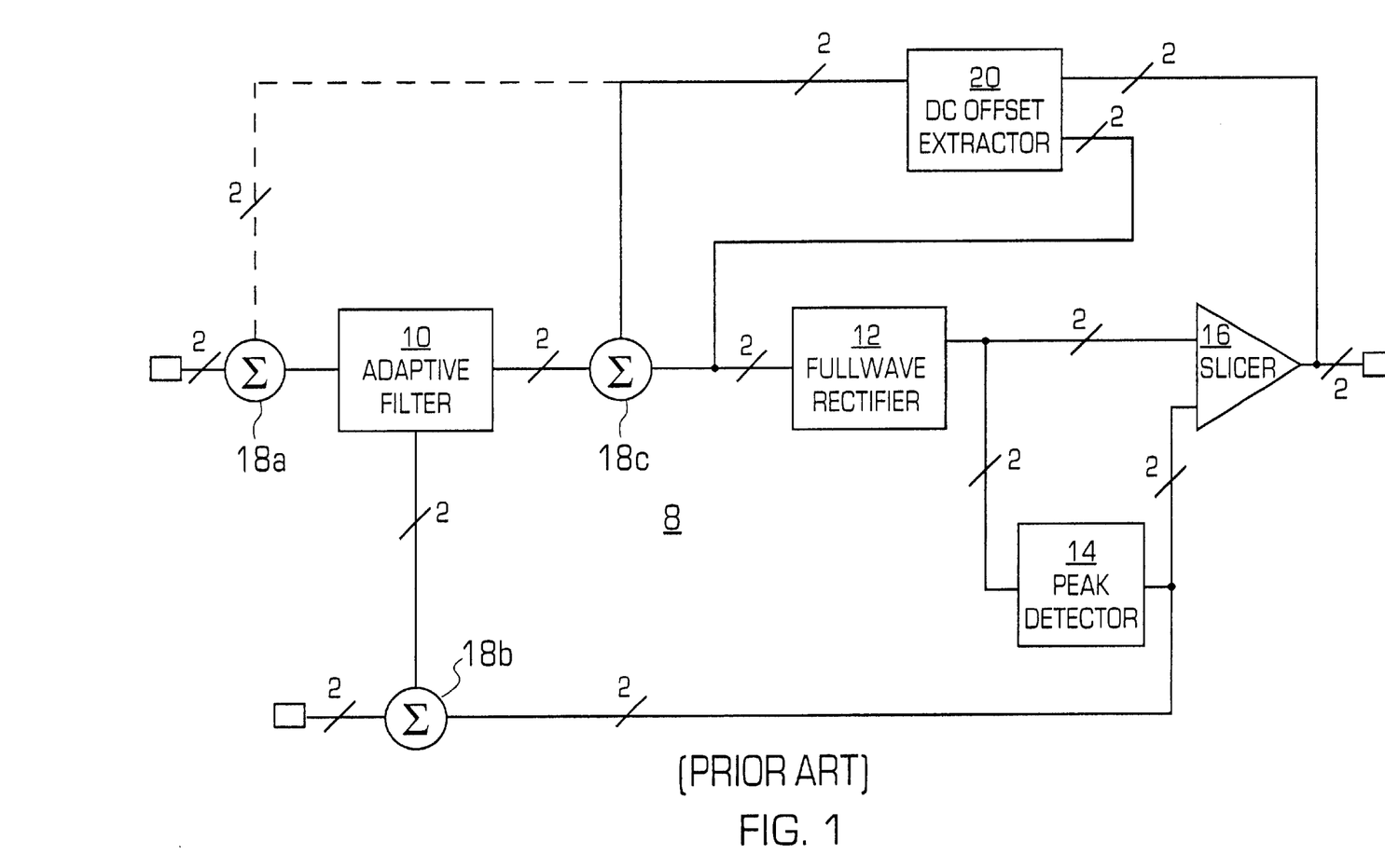
FIG. 1 is a schematic block level diagram of an adaptive equalization and baseline wander correction circuit of the prior art.

Adaptive equalization and baseline wander correction circuits are well known in the art. Referring to FIG. 1 there is shown generally an adaptive equalization and baseline wander correction circuit 8 of the prior art. The receiver circuit 8 receives an input signal which is supplied to a first summing circuit 18a, which is one of three summing circuits 18(a–c) shown in FIG. 1. The first summing circuit 18a also receives a signal from the output of a baseline wander correction circuit 20 or DC offset extractor circuit 20, to be discussed later. The output of the first summing circuit 18a is supplied to an adaptive filter 10. The adaptive filter 10 filters the output of the first summing circuit 18a based upon a control signal supplied thereto which is the output of a second summing circuit 18b. The output of the adaptive filter 10 is a signal which is supplied to a third summing circuit 18c. The third summing circuit 18c also receives as an input thereof, the output of the baseline wander correction circuit 20. The output of the third summing circuit 18c is supplied as an input to the baseline wander correction circuit 20 and also as an input to a fullwave rectifier 12.

The output of the fullwave rectifier 12 is supplied to a peak detector 14 and to a slicer 16. The peak detector 14, detects the peak of the rectified signal supplied from the fullwave rectifier 12, and supplies the peak signal to the slicer circuit 16. The output of the peak detector circuit 14 is also supplied to the second summing circuit 18b. The second summing circuit 18b also receives as an input thereof a reference signal. The output of the second summing circuit 18b is supplied as the control signal to the adaptive filter 10.

From the slicer circuit 16, the output is supplied as another input to the baseline wander correction circuit 20. As previously discussed, the baseline wander correction circuit or the DC offset extractor circuit 20 also receives as its input thereof the output of the third summing circuit 18c. The output of the baseline wander correction circuit 20 is supplied as an input to the first and/or third summing circuit 18a and/or 18c, respectively. The output of the slicer circuit 16 is the output of the receiver circuit 8 of FIG. 1.

Figure 2:
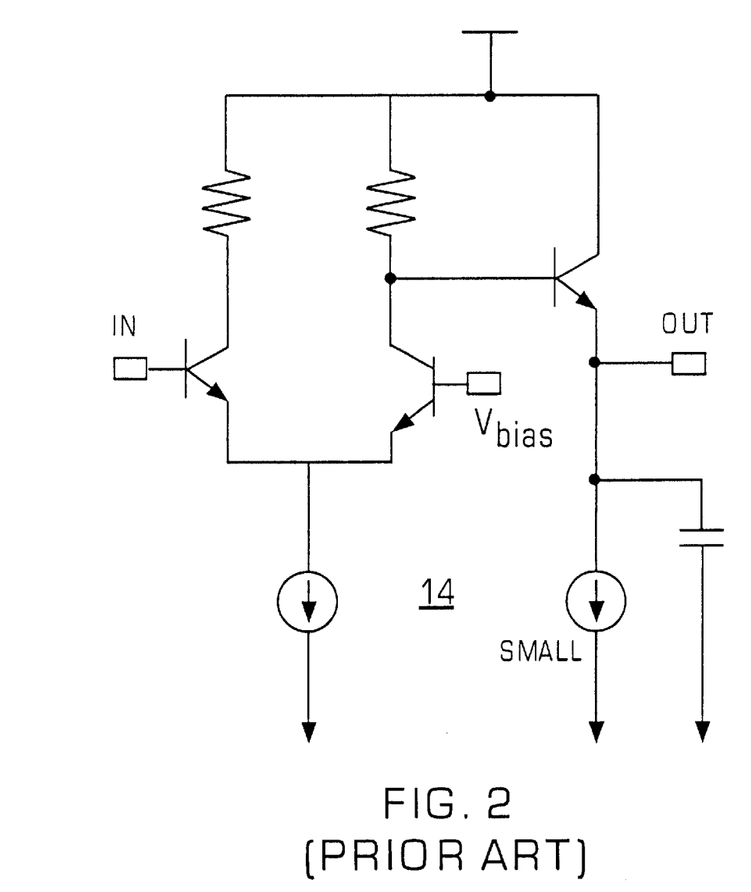
FIG. 2 is a first embodiment of a peak detector circuit used in the prior art circuit shown in FIG. 1.
Figure 3:
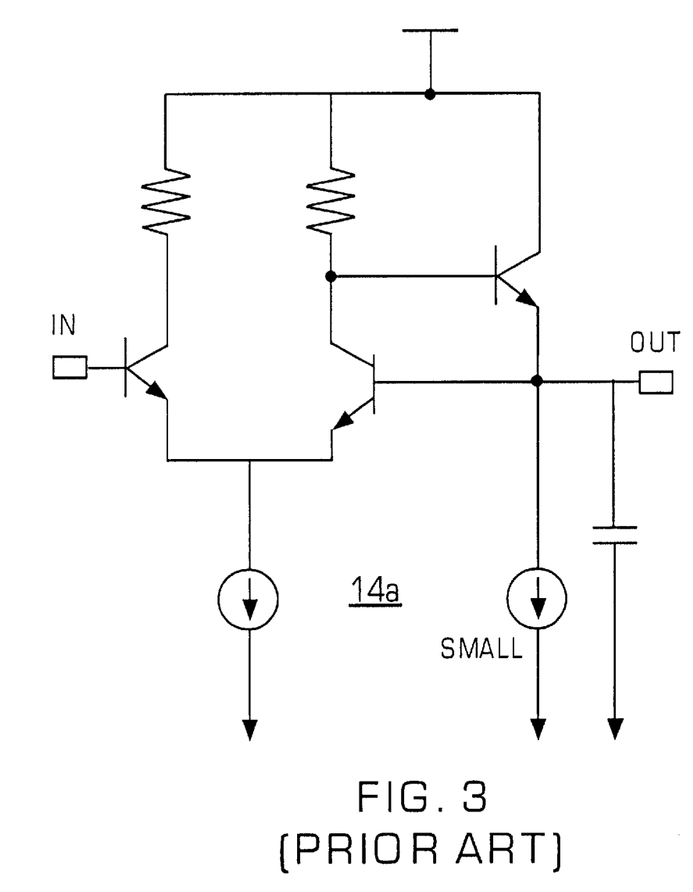
FIG. 3 is a second embodiment of a peak detector circuit used in the prior art circuit shown in FIG. 1.
Figure 4:
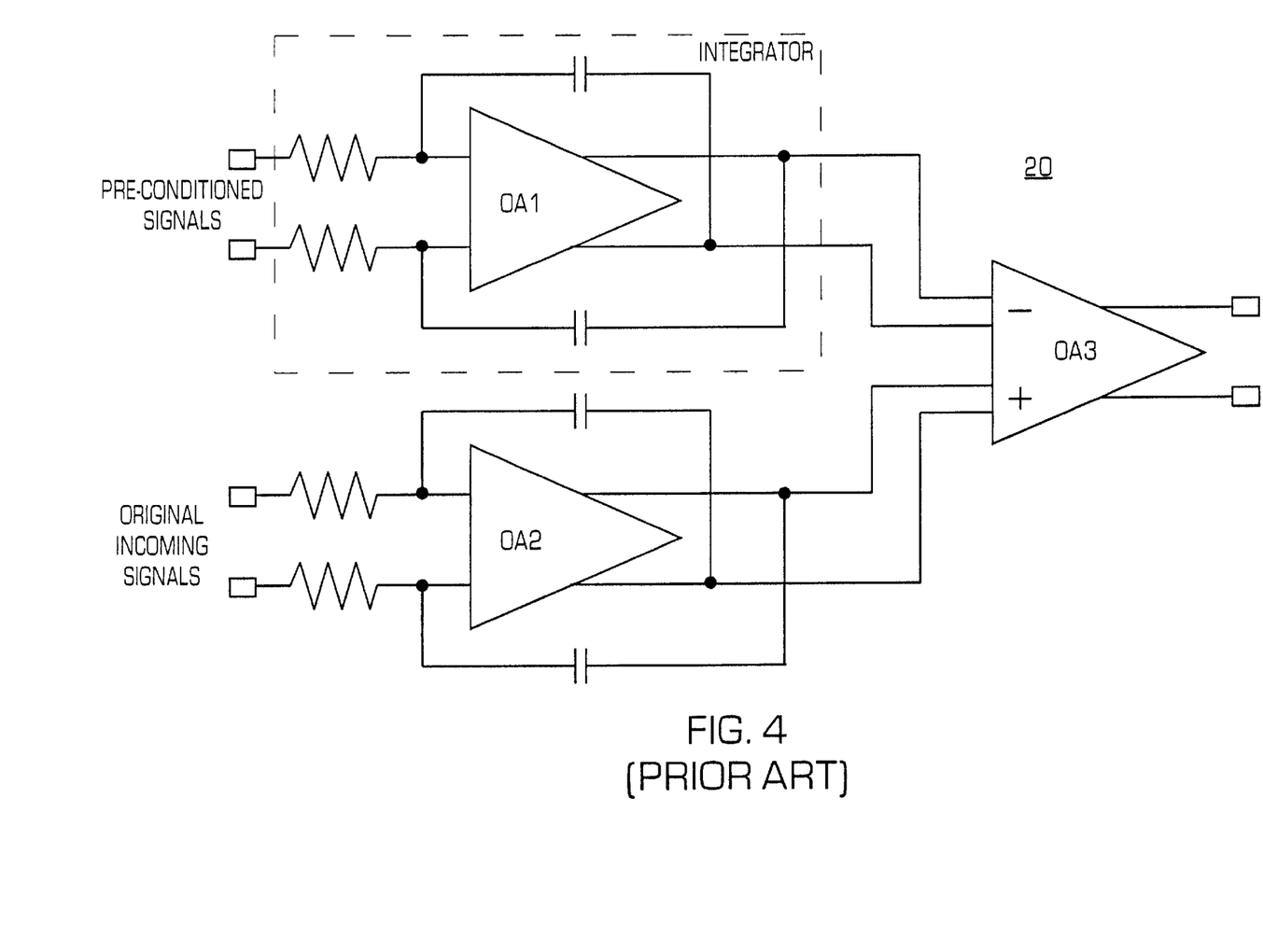
FIG. 4 is a circuit diagram of a baseline wander correction circuit used in the receiver circuit of the prior art shown in FIG. 1.

Referring to FIGS. 2, 3, and 4, there is shown various embodiments of the portions of the receiver circuit 8 shown in FIG. 1. In particular, FIG. 2 shows the circuit diagram of the peak detector circuit 14. FIG. 3 is a circuit diagram of another embodiment of the peak detector 14. FIG. 4 is an embodiment of a baseline wander correction circuit 20.

Although baseline wander correction and adaptive filter circuits are well known in the art, the prior art circuits required many large capacitors and/or large number of digital counters to store extracted DC values for controlling the adaptive filter feedback loop and for correcting the baseline wander DC offset. Thus, the die size has been relatively large.

SUMMARY OF THE INVENTION

In the present invention, an improved adaptive equalization and baseline wander correction circuit comprises an adaptive filter means for receiving an input signal and filters the input signal to generate a first signal in response to a control signal. A first halfwave rectifier means receives the first signal and generates a first rectified signal in response thereto. A first peak detector means receives the first rectified signal and generates a first peak signal in response thereto. A signal level extractor means receives the first peak signal and generates a first level signal in response thereto. A low pass filter means receives the first level signal and generates a filtered signal in response thereto. A first summing amplifier means receives the filtered signal and a reference signal and generates a control signal in response thereto. The control signal is the difference of the filtered signal and the reference signal. A second summing amplifier means receives the first signal and a feedback signal and generates a second signal in response thereto. The second signal is the difference of the first signal and the feedback signal. A second halfwave rectifier means receives the second signal and generates a second rectified signal in response thereto. A limiter means receives the first and second rectified signals and generates a third signal in response to the reference signal. A second peak detector means receives the third signal and generates a second peak signal in response thereto. A signal extractor means receives the first and second peak signals and generates a feedback signal. The feedback signal is a DC offset signal of the first and second peak signals. Finally, a slicer means receives the second rectified signal and the filtered signal and generates an output signal in response thereto.

DETAILED DESCRIPTION OF THE DRAWINGS

Figure 5:
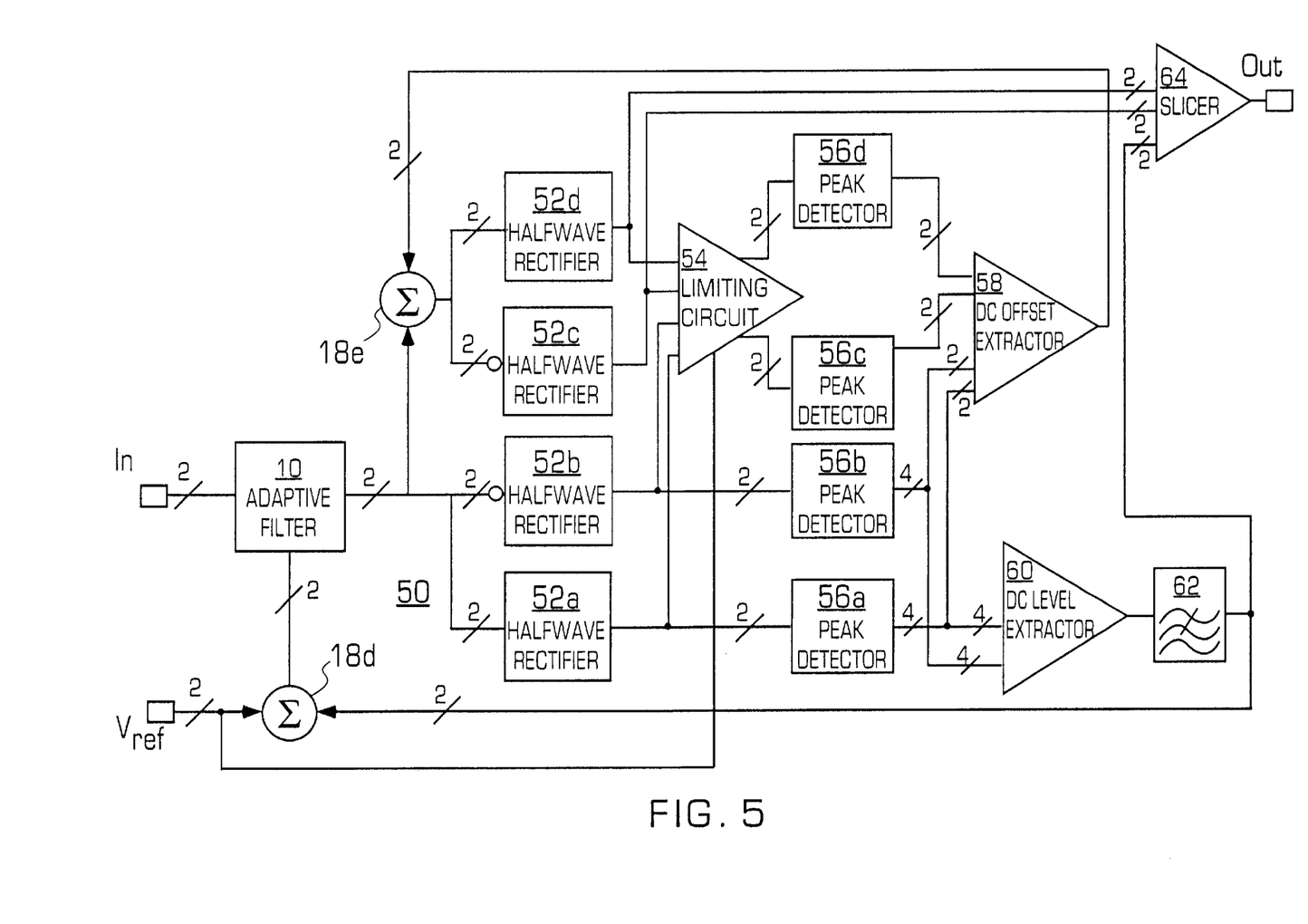
FIG. 5 is a schematic block level diagram of an improved adaptive equalization and baseline wander correction circuit of the present invention.

Referring to FIG. 5, there is shown a schematic block level diagram of an improved adaptive filter and baseline wander correction circuit 50 of the present invention. The receiver circuit 50 comprises an adaptive filter 10 for receiving the input signal. The adaptive filter 10 can be the filter of the prior art. The adaptive filter 10 receives as its input thereof an input signal and based upon a control signal supplied from a first summing amplifier 18d, generates an output signal.

Figure 9:
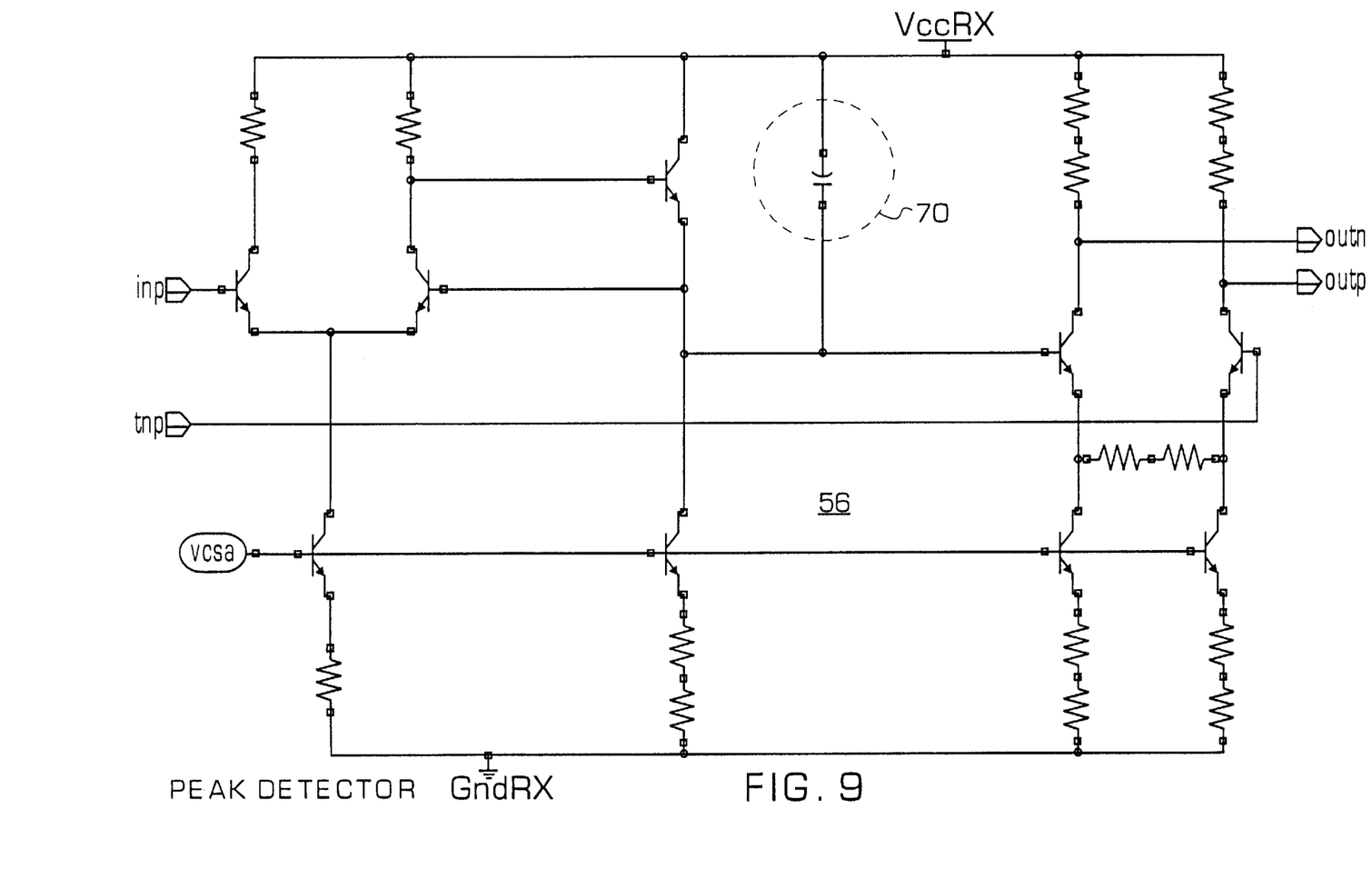
FIG. 9 is a circuit diagram of a peak detector, one of a plurality used in the improved adaptive filter and baseline wander correction circuit of the present invention shown in FIG. 5.
Figure 10:
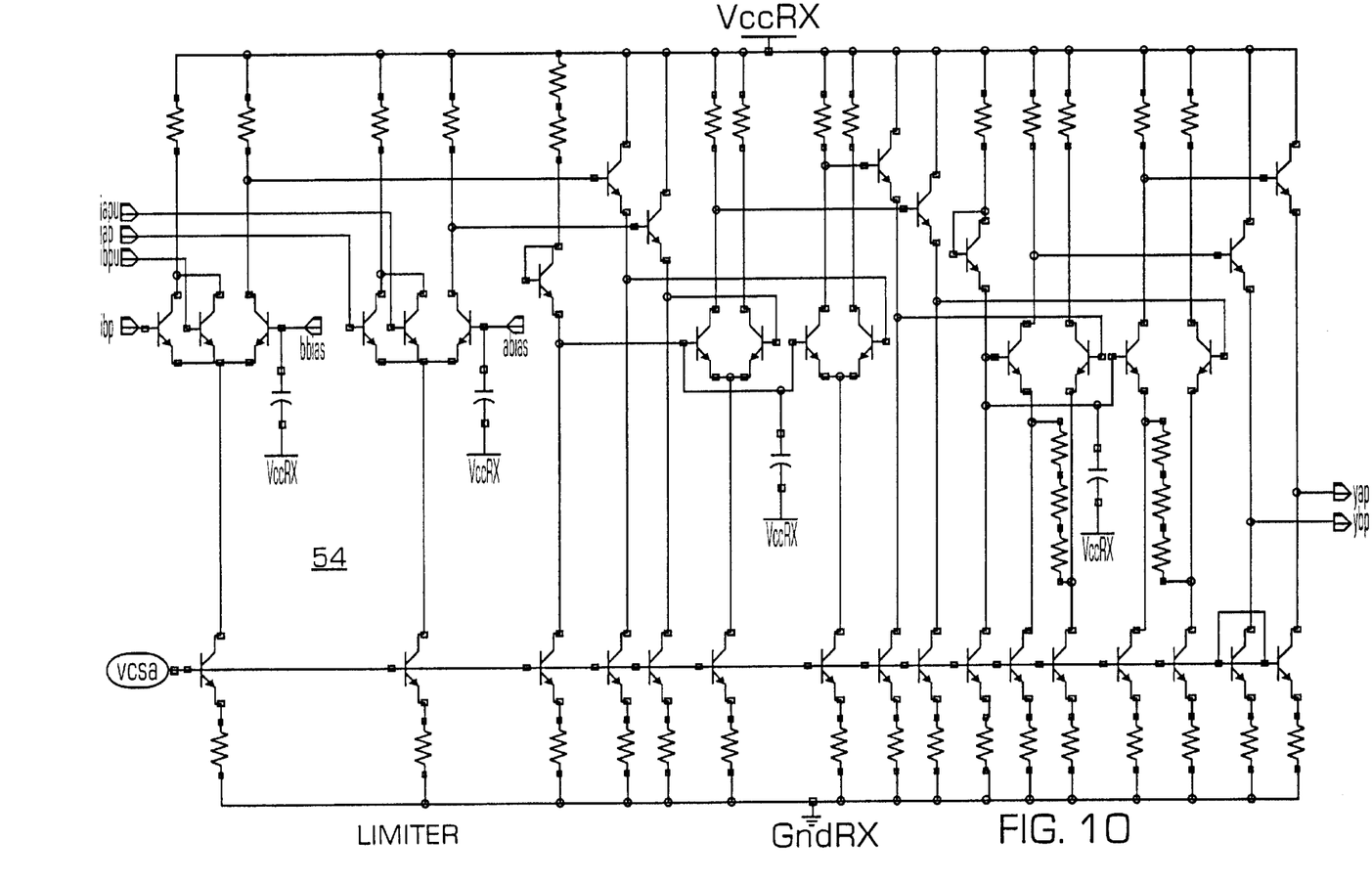
FIG. 10 is a circuit diagram of a limiter portion of the improved adaptive filter and baseline wander correction circuit of the present invention shown in FIG. 5.
Figure 11:
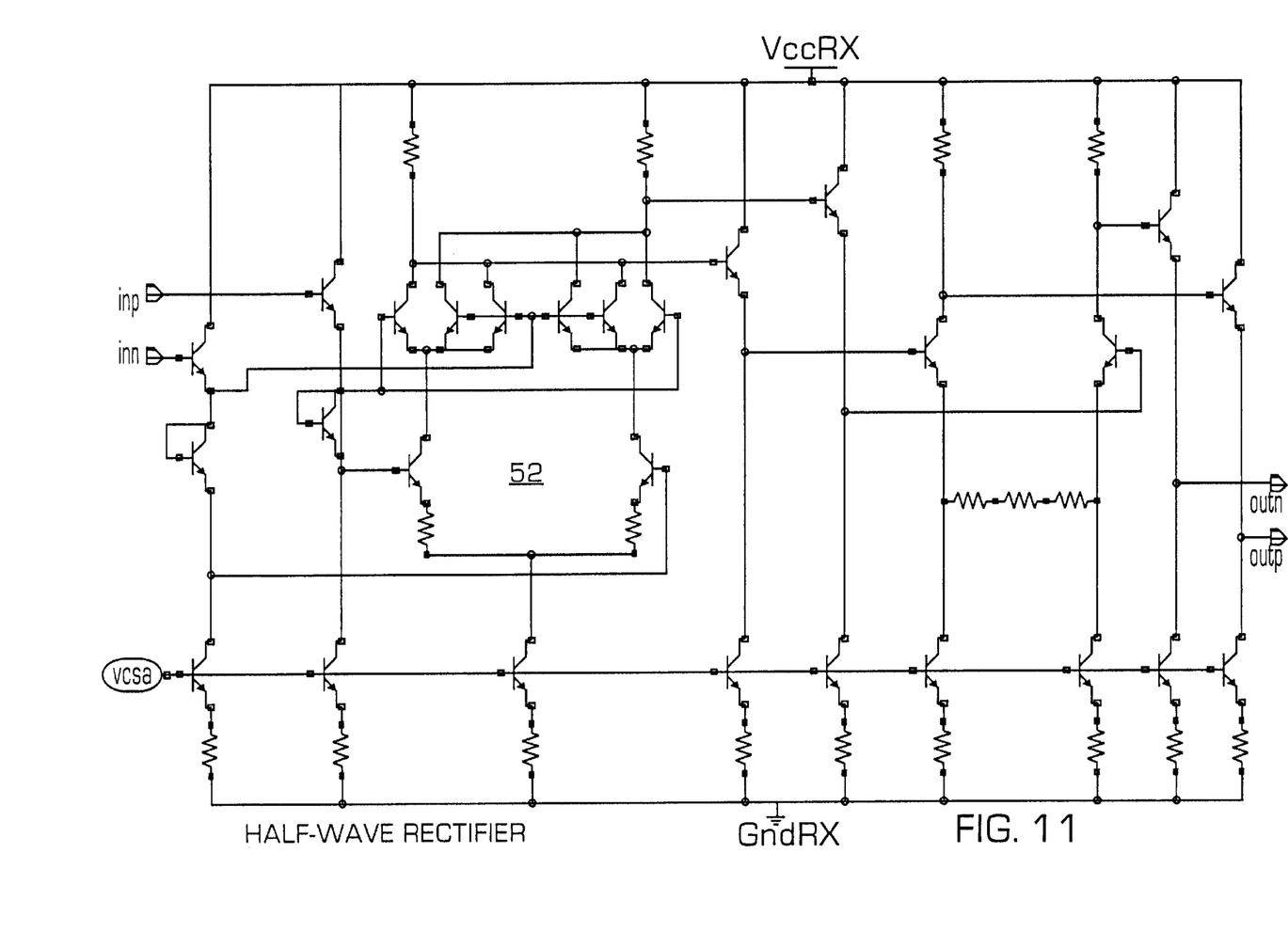
FIG. 11 is a circuit diagram of a halfwave rectifier, one of a plurality used in the improved adaptive equalization filter and baseline wander correction circuit of the present invention shown in FIG. 5.
Figure 12:
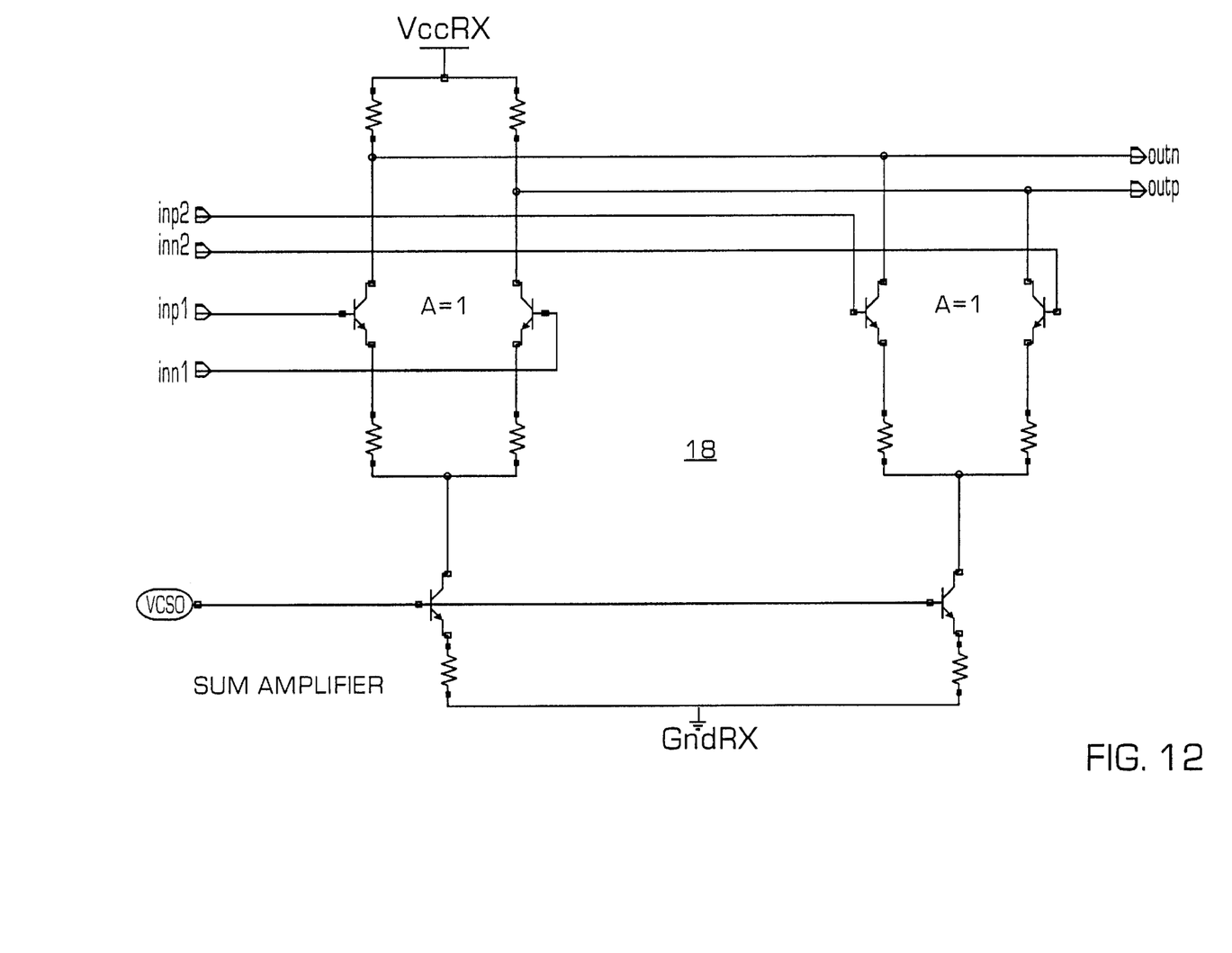
FIG. 12 is a circuit diagram of a summing amplifier circuit of a portion of the improved baseline wander correction circuit of the present invention shown in FIG. 5.

The output of the adaptive filter circuit 10 is supplied to a first halfwave rectifier 52a and a second halfwave rectifier 52b, simultaneously. Each of the first and second halfwave rectifiers 52a and 52b is identical and is shown in FIG. 11. However, the first halfwave rectifier 52a receives the positive polarity component of the signal from the adaptive filter 10, whereas the second halfwave rectifier 52b receives the negative polarity component of the signal from the adaptive filter 10. The first halfwave rectifier 52a generates a first rectified signal which is supplied to a limiter circuit 54 and to a first peak detector 56a. The second rectified signal, which is the output of the second halfwave rectifier 52b, also is supplied to the limiter circuit 54 and to a second peak detector 56b. The first peak detector 56a and the second peak detector 56b are identical and are shown in greater detail in FIG. 9.

Figure 6:
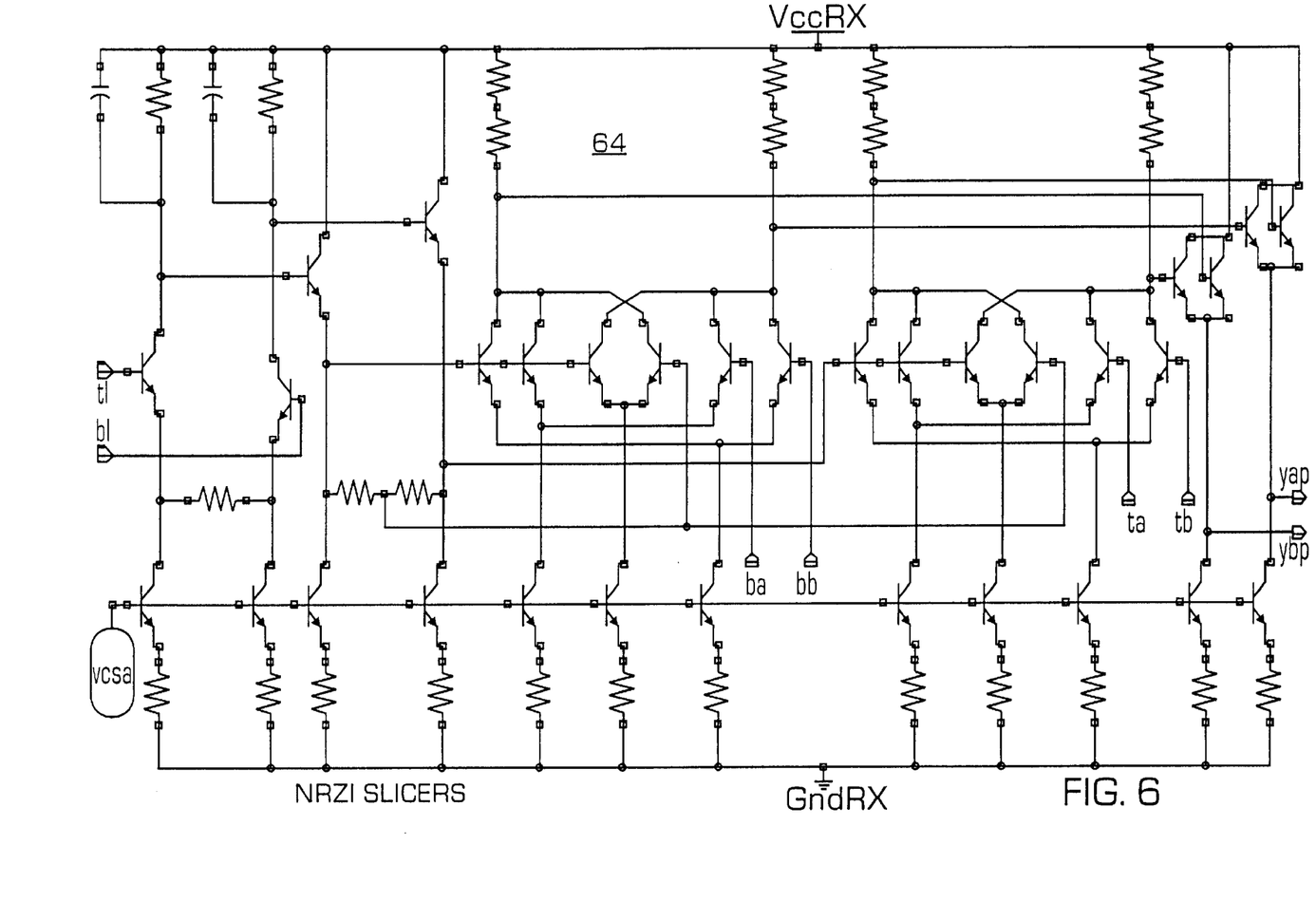
FIG. 6 is a circuit diagram of the slicer portion of the improved adaptive equalization and baseline wander correction circuit of the present invention shown in FIG. 5.
Figure 7:
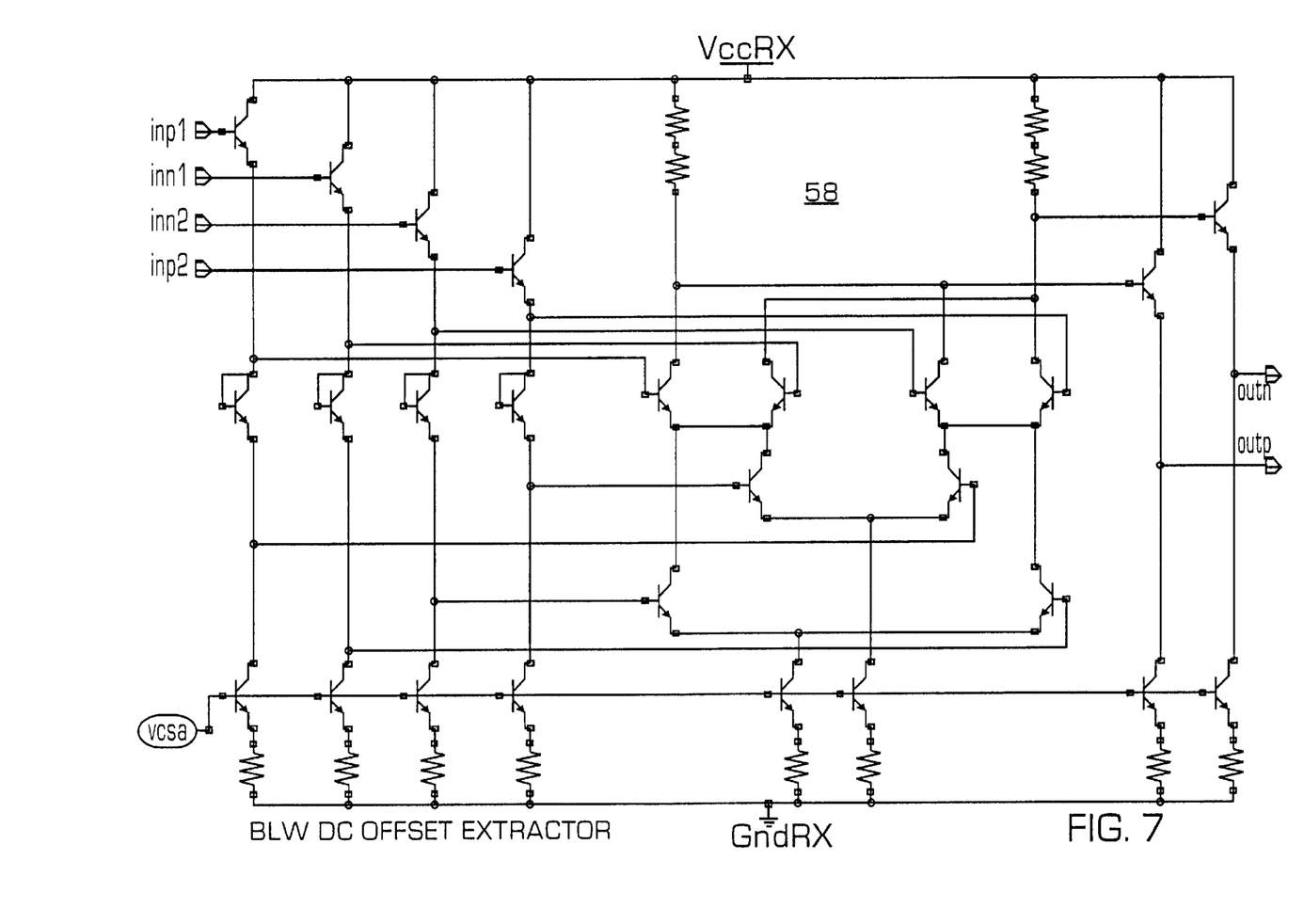
FIG. 7 is a circuit diagram of a DC offset extractor portion of the correction circuit of the present invention shown in FIG. 5.
Figure 8:
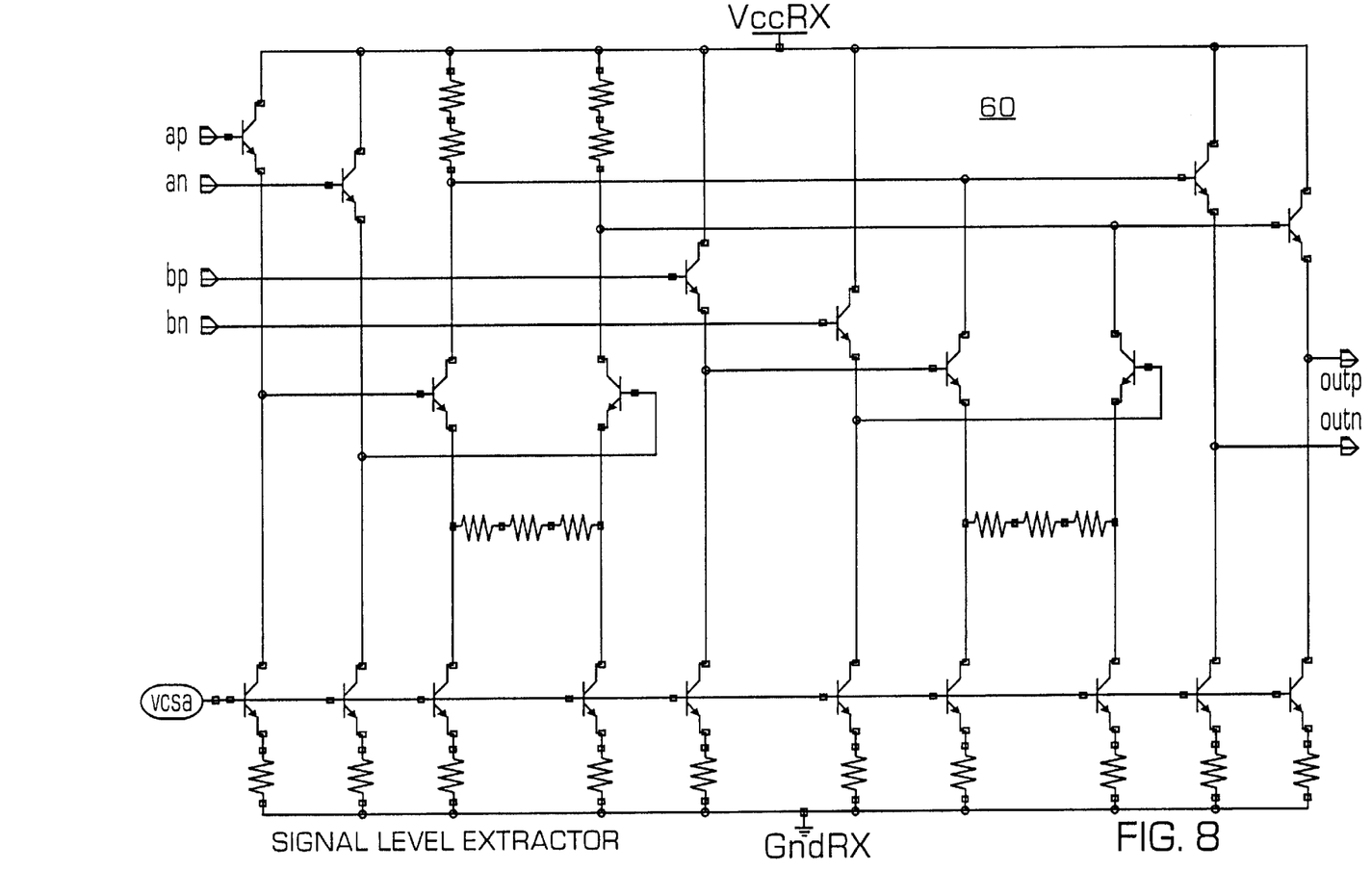
FIG. 8 is a circuit diagram of the DC signal level extractor portion of the wander correction circuit of the present invention shown in FIG. 5.

Each of the first and second peak detectors 56a and 56b generates a first and a second peak signal respectively. The first and second peak signals are supplied to a DC offset extractor circuit 58, which is shown in greater detail in FIG. 7. In addition, each of the first and second peak signals are supplied to a DC signal level extractor circuit 60, shown in greater detail in FIG. 8. The DC signal level extractor circuit 60 generates a first level signal in response thereto. The first level signal is supplied to a low pass filter circuit 62, which is of conventional design. The low pass filter circuit 62 generates a filtered signal which is supplied to the first summing amplifier 18d and to a slicer circuit 64, which is shown in greater detail in FIG. 6.

The first summing amplifier 18d also receives as its input thereof a reference signal and together with the filtered signal generates a control signal which is supplied to the adaptive filter circuit 10.

The foregoing circuit elements describes the adaptive filter loop portion of the receiver circuit 50 of the present invention.

The output of the adaptive filter circuit 10 is also supplied to a second summing circuit 18e. The second summing circuit 18e receives as its input thereof the output of the DC offset extractor circuit 58. In response thereto, the second summing amplifier 18e generates a second signal, which is supplied to a third halfwave rectifier 52c and to a fourth halfwave rectifier 52d, simultaneously. The third and fourth halfwave rectifier circuits 52c and 52d are similar to the first and second halfwave rectifier circuit 52a and 52b shown in FIG. 11 and described previously. The only difference is that the third halfwave rectifier 52c receives as its input the negative polarity component of the second signal from the second summing amplifier circuit 18e. The fourth halfwave rectifier circuit 52d receives as its input a positive polarity component of the second signal from the second summing amplifier circuit 18e. The output of the third halfwave rectifier 52c is a third rectified signal which is supplied to the limiter circuit 54. The output of the fourth halfwave rectifier 52d is the fourth rectified signal which is also supplied to the limiting circuit 54.

The limiting circuit 54 receives as its input the outputs of the first, second, third, and fourth halfwave rectifiers 52(a–d) and the reference signal and based upon the reference signal generates a first and a second limited signal respectively. The first limited signal is supplied to a third peak detector 56c. The second limited signal is supplied to a fourth peak detective signal 56d. Each of the third and fourth peak detector circuits 56c and 56d is of the type shown and described in FIG. 9.

The outputs of the third and fourth peak detectors 56c and 56d are also supplied to the DC offset extractor circuit 58. The DC offset extractor circuit 58 receives as its input the first, second, third, and fourth peak signals 56(a–d) and generates a DC offset signal, in response thereto. The DC offset signal is supplied as another input to the second summing amplifier circuit 18e.

Finally, the output of the third and fourth halfwave rectifiers 56c and 56d are supplied to the slicer circuit 64 along with the filtered signal which is the output of the low pass filter 62. The output of the slicer circuit 64 is the output of the receiver circuit 50 of the present invention.

The foregoing description of the circuit elements describes the baseline wander correction loop circuit portion of the receiver circuit of the present invention.

THEORY OF OPERATION

When an input signal is received by the receiver circuit 50, the adaptive filter 10 aligns the phases and reshapes the magnitudes of the attenuated and distorted received signals. The output of the adaptive filter 10 is supplied to the first and second halfwave rectifiers 52a and 52b. Each of the halfwave rectifiers 52a and 52b clips off the receiving MLT-3 signals into two parts: a positive polarity component and a negative polarity component with each component signal (positive or negative) transformed into NRZ format. The outputs of the first and second halfwave rectifiers 52a and 52b are supplied to the first and second peak detectors 56a and 5Gb. Each of the peak detectors 56a and 5Gb samples and holds the DC values for the peaks of the incoming signals. Each peak detector 56 has a capacitor 70 to hold the DC value signal and to reduce unwanted ripples generated during the extraction process. Thus, for example, if the output signal of the adaptive filter 10 comprises a signal having a positive polarity component A and a negative polarity component B, the output of the first halfwave rectifier 52a is the signal A and the output of the second halfwave rectifier 52b is the signal B.

The peak signals A and B are supplied to the signal level extractor 60 which generates as its output thereof the signal (A+B)/2, or an average of the peak signals A and B. The capacitor 70 in each peak detector 56 holds the value of the signals received in the adaptive filter loop portion for use in the baseline wander loop portion of the receiver circuit 50.

The DC level extractor 60 determines the average peak signal. In the case of incoming signals with baseline wander effect and/or system DC offset, the absolute AC magnitude level of the incoming signals is still the same but the relative peak levels to a reference are shifted. The low pass filter 62 removes the ripples riding on the DC signals extracted from the peak detectors 56a and 56b and averaged by the DC signal level extractor 60. It addresses the stability of the adapting feedback loop.

The baseline wander correction portion of the circuit 50 operates as follows. The signal received by the adaptive filter 10 is passed through the second summing amplifier 18e, which is supplied to a third and a fourth halfwave rectifiers 52c and 52d, respectively. The third and fourth halfwave rectifiers 52c and 52d are identical in function to the first and second halfwave rectifiers 52a and 52b. They each clip off the corrected MLT-3 signals, which are derived from the DC offset signals from 58 and the incoming MLT-3 signals from 10, into two parts: a positive polarity component and a negative polarity component with each transformed into NRZ format. Thus, if the incoming signal has a positive polarity component A and a negative polarity component B, the third halfwave rectifier 52c would generate the signal B. The fourth halfwave rectifier 52d would generate the signal A.

The limiter circuit 54 receives the output of the first, second, third and fourth halfwave rectifiers 52(a–d). In response to the reference signal, the limiter circuit 54 generates a first and a second limited signals. The limiter circuit 54 removes the variations and the amplitude of the incoming baseline wander signal and/or the DC offset signal by limiting each to a fixed level. Thus, the limiter circuit 54 receives the second rectified signal from the second halfwave rectifier 52b and the third rectified signal from the third halfwave rectifier 52c and ORs them together. The logical function to OR the signals from the second and third halfwave rectifiers 52b and 52c produces a rectified signal which has a larger in magnitude of the signals from the two halfwave rectifier circuits 52b and 52c, which rectify the negative polarity component of the incoming signal. Similarly, the output of the first and fourth halfwave rectifiers 52a and 52d are ORed together by the limiter circuit 54. The logical function of ORing the output of the first and fourth rectified signals, outputs of the first and fourth halfwave rectifiers 52a and 52d, results in the selection of the rectified signal which is the larger in magnitude of the positive polarity component of the input signal. These are then the first and second limited signals which are supplied to the third and fourth peak detectors 56c and 56d respectively. Thus, if the input signal has a positive polarity component of A and a negative polarity component of B, the input to the peak detectors 56c and 56d will be $\overline{B}$ and A respectively whereas $\overline{B}$ and $\overline{A}$ are the limited signals.

The result of the third and fourth peak detectors 56c and 56d, which are the third and fourth peak signals respectively, are supplied to the DC offset extractor circuit 58.

As previously discussed, each of the peak detectors 56(a–d) are identical and comprise a capacitor 70 to store the DC values of the peak of the incoming signals. The outputs of the first, second, third, and fourth peak detector circuits 56(a–d) are supplied to the DC offset extractor circuit 58. The DC offset extractor circuit 58 receives the output values of the first and second peak detectors 56a and 56b and performs a difference therebetween. In addition, it receives the output of the third and fourth peak detectors 56c and 56d and performs a difference therebetween. Finally, the two signals are then summed. Thus, if the output of the first, second, third and fourth peak detectors 56(a–d) are A, B, $\overline{B}$, $\overline{A}$, respectively, then the result of the operation by the DC offset extractor circuit is the signal $(A-B)+(\overline{B}-\overline{A})$. This is the same as $(A-\overline{A})-(B-\overline{B})$. The output of the DC offset extractor circuit 58 is then supplied as an input to the second summing amplifier 18e as another input thereto, thereby forming the baseline wander feedback loop.

Finally, the output of the third and fourth halfwave rectifiers 52c and 52d, along with the output of low pass filter 62, are supplied to a slicer circuit 64. The slicer circuit 64 converts and slices the corrected MLT-3 signals into the digital NRZ output signals, which is the output of the receiver circuit 50.

From the foregoing, it can be seen that the receiver circuit 50 of the present invention accomplishes baseline wander correction as well as adaptive equalization through the use of dual halfwave rectifiers in each of the feedback loops, instead of a single fullwave rectifier to extract the signal information. In addition, the capacitor 70 in each of the peak detectors 56(a–d) serves to store the DC signal level of the incoming signal thereby permitting the signal to be shared between the adaptive filter block and the baseline wander correction block. This reduces the die size and the driving circuits. Finally, by separating the baseline wander DC offset value from the adaptive filter loop, this prevents the adaptive filter from falsely functioning out of the adaptive filter's DC controlled value. In addition, by implementing an OR slicer circuit, instead of another feedback path, this fixes the threshold reference within incoming signal swing.

What is claimed is:

1. An adaptive equalization and baseline wander correction circuit comprising:

adaptive filter means for receiving an input signal and for filtering said input signal to generate a first signal in response to a control signal;

first half-wave rectifier means for receiving said first signal and for generating a first rectified signal in response thereto;

first peak detector means for receiving said first rectified signal and for generating a first peak signal in response thereto;

signal level extractor means for receiving said first peak signal and for generating a first level signal in response thereto;

low pass filter means for receiving said first level signal and for generating a filtered signal in response thereto;

first summing amplifier means for receiving said filtered signal and a reference signal and for generating said control signal, in response thereto; said control signal being the sum of said filtered signal and said reference signal;

second summing amplifier means for receiving said first signal and a feedback signal and for generating a second signal in response thereto; said second signal being the sum of said first signal and said feedback signal;

second halfwave rectifier means for receiving said second signal and for generating a second rectified signal in response thereto;

limiter means for receiving said first and second rectified signals and for generating a third signal in response to said reference signal;

second peak detector means for receiving said third signal and for generating a second peak signal in response thereto;

signal extractor means for receiving said first and second peak signals and for generating said feedback signal; said feedback signal being a DC offset signal of said first and second peak signals; and slicer means for receiving said second rectified signal and said filtered signal and for generating an output signal in response thereto.

2. The circuit of claim 1 wherein said first halfwave rectifier means further comprises:

a first halfwave rectifier for receiving said first signal and for rectifying a positive polarity component of said first signal to generate a first component rectified signal; and a second halfwave rectifier for receiving said first signal and for rectifying a negative polarity component of said first signal to generate a second component rectified signal.

3. The circuit of claim 2 wherein said first peak detector means further comprises:
- a first peak detector for receiving said first component rectified signal and for generating a first component peak signal in response thereto;
- a second peak detector for receiving said second component rectified signal and for generating a second component peak signal in response thereto.

4. The circuit of claim 3 wherein said signal level extractor means receives said first component rectified signal and said second component rectified signal and generates said first level signal, wherein said level signal being the average of said first component rectified signal and said first negative rectified signal.

5. The circuit of claim 1 wherein said second halfwave rectifier means further comprises:
- a third halfwave rectifier for receiving said second signal and for rectifying a positive polarity component of said second signal to generate a third component rectified signal; and
- a fourth halfwave rectifier for receiving said second signal and for rectifying a negative polarity component of said second signal to generate a fourth component rectified signal.

6. The circuit of claim 5 wherein first halfwave rectifier means further comprises:
- a first halfwave rectifier for receiving said first signal and for rectifying a positive polarity component of said first signal to generate a first component rectified signal; and
- a second halfwave rectifier for receiving said first signal and for rectifying a negative polarity component of said first signal to generate a second component rectified signal.

7. The circuit of claim 6 wherein said limiter means receives said first, second, third and fourth component rectified signals and generates a third limited signal and a fourth limited signal in response to said reference signal.

8. The circuit of claim 7 wherein said first peak detector means further comprises:
- a first peak detector for receiving said first component rectified signal and for generating a first component peak signal in response thereto;
- a second peak detector for receiving said second component rectified signal and for generating a second component peak signal in response thereto; and
- said second peak detector means further comprises:
  - a third peak detector for receiving said third limited signal and for generating a third component peak signal in response thereto;
  - a fourth peak detector for receiving said fourth limited signal and for generating a fourth component peak signal in response thereto.

9. The circuit of claim 8 wherein said signal extractor means receives said first, second, third and fourth component peak signals and generates said feedback signal in response thereto; said feedback signal being the difference of the first and second component peak signals plus the difference of the third and fourth component peak signals.

10. The circuit of claim 3 wherein each of said first and second peak detectors comprises a capacitor to store the first and second component peak signals respectively.

11. The circuit of claim 8 wherein each of said third and fourth peak detectors comprises a capacitor to store the third and fourth component peak signals respectively.

* * * * *